(12) United States Patent
Toba et al.

(10) Patent No.: US 10,477,269 B2
(45) Date of Patent: Nov. 12, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventors: Kazuaki Toba, Kanagawa (JP); Gen Ichimura, Tokyo (JP); Satoshi Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 181 days.

(21) Appl. No.: 15/563,341

(22) PCT Filed: Apr. 4, 2016

(86) PCT No.: PCT/JP2016/060985
  § 371 (c)(1),
  (2) Date: Sep. 29, 2017

(87) PCT Pub. No.: WO2016/163327
  PCT Pub. Date: Oct. 13, 2016

(65) Prior Publication Data
  US 2018/0069911 A1  Mar. 8, 2018

(30) Foreign Application Priority Data
  Apr. 8, 2015 (JP) ................. 2015-078962

(51) Int. Cl.
  *H04N 21/439* (2011.01)
  *H04N 1/23* (2006.01)
  *G10L 19/008* (2013.01)
  *H04L 29/06* (2006.01)
  (Continued)

(52) U.S. Cl.
  CPC ....... *H04N 21/4398* (2013.01); *G10L 19/008* (2013.01); *G10L 19/167* (2013.01);
  (Continued)

(58) Field of Classification Search
  CPC ....... H04R 3/12; H04S 3/008; H04S 2400/01; H04S 2400/11; G10L 19/008;
  (Continued)

(56) References Cited

U.S. PATENT DOCUMENTS

2008/0080596 A1* 4/2008 Inoue ................. G06F 3/14
  375/211
2012/0236949 A1* 9/2012 Keating ............. H04N 21/4122
  375/259
(Continued)

FOREIGN PATENT DOCUMENTS

AU  2013355504 A1  7/2015
CA  2893729 A1  6/2014
(Continued)

OTHER PUBLICATIONS

International Search Report and Written Opinion of PCT Application No. PCT/JP2016/060985, dated Jun. 7, 2016, 7 pages of ISRWO.

*Primary Examiner* — Jesse A Elbin
(74) *Attorney, Agent, or Firm* — Chip Law Group

(57) ABSTRACT

To make it possible to apply optimal decoding processing to an encoded stream including a plurality of pieces of encoded data having degree-of-priority information. An encoded stream including a plurality of pieces of encoded data having degree-of-priority information is acquired. Whether or not a decoding ability of a reception side is equal to or greater than a decoding ability of the own side is determined on the basis of decoding ability information of the reception side indicating to what number of degree of priority decoding can be performed. In a case where the decoding ability of the reception side is equal to or greater than the decoding ability of the own side, an encoded stream is transmitted. On the contrary, in a case where the decoding ability of the reception side is less than the decoding ability of the own side, a (Continued)

decoded stream including decoded data generated by subjecting the encoded stream to decoding processing is transmitted.

9 Claims, 8 Drawing Sheets

(51) Int. Cl.
    *H04S 3/00*     (2006.01)
    *G10L 19/16*     (2013.01)
    *H04N 21/4363*     (2011.01)
    *H04R 3/12*     (2006.01)

(52) U.S. Cl.
    CPC ........ *H04L 65/4084* (2013.01); *H04L 65/607* (2013.01); *H04N 1/2315* (2013.01); *H04N 1/2346* (2013.01); *H04N 1/2369* (2013.01); *H04N 21/439* (2013.01); *H04N 21/43635* (2013.01); *H04S 3/008* (2013.01); *H04R 3/12* (2013.01); *H04S 2400/01* (2013.01); *H04S 2400/11* (2013.01)

(58) Field of Classification Search
    CPC ... G10L 19/167; H04L 65/607; H04N 1/2315; H04N 1/2346; H04N 1/2369; H04N 21/4363; H04N 21/43635; H04N 21/439; H04N 21/4394; H04N 21/4398
    USPC .......................................................... 700/94
    See application file for complete search history.

(56) References Cited

U.S. PATENT DOCUMENTS

| | | |
|---|---|---|
| 2015/0350802 A1 | 12/2015 | Jo et al. |
| 2016/0021430 A1* | 1/2016 | LaBosco ............ H04N 21/4398 725/31 |
| 2018/0033440 A1* | 2/2018 | Chinen ................. G10L 19/008 |

FOREIGN PATENT DOCUMENTS

| | | |
|---|---|---|
| CN | 104969576 A | 10/2015 |
| EP | 2930952 A1 | 10/2015 |
| JP | 2013-135454 A | 7/2013 |
| JP | 2014-523190 A | 9/2014 |
| JP | 2016-503635 A | 2/2016 |
| MX | 2015007100 A | 9/2015 |
| WO | 2014/088328 A1 | 6/2014 |

\* cited by examiner

| 7 | 6 | 5 | 4 | 3 | 2 | 1 | 0 |
|---|---|---|---|---|---|---|---|
| RESERVE | RESERVE | RESERVE | RESERVE | Pri[3] | Pri[2] | Pri[1] | Pri[0] |

FIG. 3(a)

Pri[3:0]
0000: NOT COMPATIBLE WITH DECODING
0001: ONLY DECODING AT DEGREE OF PRIORITY 1 CAN BE PERFORMED
0010: DECODING CAN BE PERFORMED TO DEGREE OF PRIORITY 2
0011: DECODING CAN BE PERFORMED TO DEGREE OF PRIORITY 3
..
0111: DECODING CAN BE PERFORMED TO DEGREE OF PRIORITY 7
1111: RESERVE

FIG. 3(b)

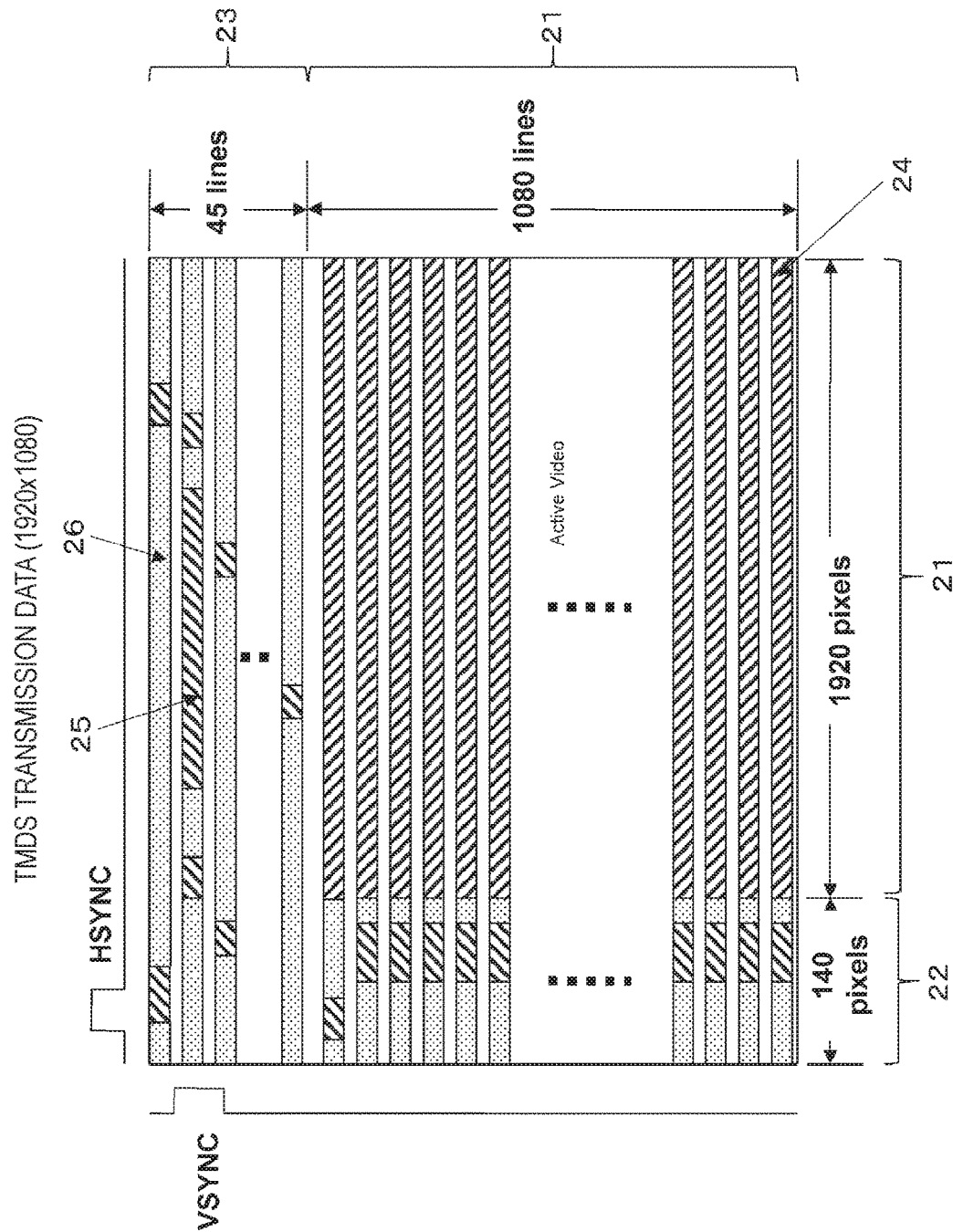

TRANSMISSION APPARATUS, TRANSMISSION METHOD, RECEPTION APPARATUS, AND RECEPTION METHOD

CROSS REFERENCE TO RELATED APPLICATIONS

This application is a U.S. National Phase of International Patent Application No. PCT/JP2016/060985 filed on Apr. 4, 2016, which claims priority benefit of Japanese Patent Application No. JP 2015-078962 filed in the Japan Patent Office on Apr. 8, 2015. Each of the above-referenced applications is hereby incorporated herein by reference in its entirety.

TECHNICAL FIELD

The present disclosure relates to a transmission apparatus, a transmission method, a reception apparatus, and a reception method, and specifically relates to a transmission apparatus and the like for treating a plurality of pieces of encoded data having degree-of-priority information.

BACKGROUND ART

Conventionally, a receiver could have notified a transmitter of only being decodable via a digital interface. In this case, in a case where both the transmitter and the receiver can perform decoding, transmission is performed in such a manner that the transmitter determines which performs decoding or a viewer specifies a device to perform decoding by the viewer's operation. The transmitter cannot know quality of a decoding ability of the receiver, and, also for the viewer, it is extremely difficult to determine which decoding ability is more superior between two devices.

For example, Patent Literature 1 discloses a mixing technology of object-based audio. The object-based audio realizes stereophonic sound by supplying individual object sound sources without mixing the object sound sources and rendering the individual object sound sources on a reproduction device side.

An encoded stream of object-based audio includes encoded data of a plurality of object sound sources. The encoded data of each of the object sound sources is made up of not only sound data but also metadata such as position information on an axis of coordinates. It is considered that the encoded data of each object sound source is caused to have degree-of-priority information indicating a degree of priority at the time of decoding.

CITATION LIST

Patent Literature

Patent Literature 1: JP 2014-523190T

DISCLOSURE OF INVENTION

Technical Problem

The present technology can apply optimal decoding processing to an encoded stream including a plurality of pieces of encoded data having degree-of-priority information.

Solution to Problem

A concept of the present technology is a transmission apparatus including: a stream acquisition unit configured to acquire an encoded stream including a plurality of pieces of encoded data having degree-of-priority information; a decoding unit configured to subject the encoded stream acquired in the stream acquisition unit to decoding processing and generate a decoded stream including decoded data; a determination unit configured to determine whether or not a decoding ability of a reception side is equal to or greater than a decoding ability of the own apparatus on the basis of decoding ability information of the reception side indicating to what number of degree of priority decoding can be performed; and a transmission unit configured to, in a case where the determination unit determines that the decoding ability of the reception side is equal to or greater than the decoding ability of the own apparatus, transmit the encoded stream acquired in the stream acquisition unit to the reception side via a digital interface and, in a case where the determination unit determines that the decoding ability of the reception side is less than the decoding ability of the own apparatus, transmit the decoded stream generated in the decoding unit to the reception side via the digital interface.

In the present technology, the stream acquisition unit acquires an encoded stream including a plurality of pieces of encoded data having degree-of-priority information. The decoding unit subjects the encoded stream acquired in the stream acquisition unit to decoding processing and generates a decoded stream including decoded data. For example, the encoded stream may be an encoded audio stream of object-based audio including encoded data of a plurality of object sound sources having degree-of-priority information, and the decoding unit may subject the encoded audio stream acquired in the stream acquisition unit to decoding processing and generate, as the decoded data, a decoded audio stream including audio data having a predetermined number of channels.

The determination unit determines whether or not the decoding ability of the reception side is equal to or greater than the decoding ability of the own apparatus on the basis of the decoding ability information of the reception side, the decoding ability information indicating to what number of degree of priority decoding can be performed. For example, an information reception unit configured to receive the decoding ability information of the reception side from the reception side via the digital interface may be further included.

The transmission unit transmits the encoded stream acquired in the stream acquisition unit or the decoded stream generated in the decoding unit to the reception side via the digital interface. For example, the digital interface may be an HDMI. In this case, in a case where the determination unit determines that the decoding ability of the reception side is equal to or greater than the decoding ability of the own apparatus, the encoded stream is transmitted, and, in a case where the determination unit determines that the decoding ability on the reception side is less than the decoding ability of the own apparatus, the decoded stream is transmitted.

As described above, in the present technology, in a case where the decoding ability of the reception side is equal to or greater than the decoding ability of the own apparatus, an encoded stream is transmitted, and, in a case where the decoding ability of the reception side is less than the decoding ability of the own apparatus, a decoded stream is transmitted. Therefore, it is possible to apply optimal decoding processing to the encoded stream.

Another concept of the present technology is a reception apparatus including: an information transmission unit configured to transmit decoding ability information of the own apparatus indicating to what number of degree of priority decoding can be performed to a transmission side via a digital interface; a reception unit configured to receive an encoded stream including a plurality of pieces of encoded data having degree-of-priority information or a decoded stream including decoded data generated by subjecting the encoded stream to decoding processing from the transmission side via the digital interface; and a decoding unit configured to, in a case where the reception unit receives the encoded stream, subject the encoded stream to decoding processing and generate a decoded stream including decoded data.

In the present technology, the information transmission unit transmits the decoding ability information of the own apparatus indicating to what number of degree of priority decoding can be performed to the transmission side via the digital interface. For example, the digital interface may be an HDMI.

The reception unit receives an encoded stream including a plurality of pieces of encoded data having degree-of-priority information or a decoded stream including decoded data generated by subjecting this encoded stream to decoding processing from the transmission side via the digital interface. When the reception unit receives the encoded stream, the decoding unit subjects this encoded stream to decoding processing and generates a decoded stream including decoded data.

For example, the encoded stream may be an encoded audio stream of object-based audio including encoded data of a plurality of object sound sources having degree-of-priority information, and the decoded stream may include, as the decoded data, audio data having a predetermined number of channels generated by subjecting the encoded audio stream to decoding processing.

As described above, in the present technology, the decoding ability information of the own apparatus is transmitted to the transmission side via the digital interface, and, based on this decoding ability information, the transmission side can determine whether or not the decoding ability of the reception side is equal to or greater than the decoding ability of the own apparatus and transmit an encoded stream in a case where the decoding ability of the reception side is equal to or greater than the decoding ability of the own apparatus and transmit a decoded stream in a case where the decoding ability of the reception side is less than the decoding ability of the own apparatus. Therefore, it is possible to apply optimal decoding processing to the encoded stream.

Advantageous Effects of Invention

According to the present technology, it is possible to apply optimal decoding processing to an encoded stream including a plurality of pieces of encoded data having degree-of-priority information. The effects described in the present disclosure are exemplified effects and are not limitative; there may be achieved additional effects.

BRIEF DESCRIPTION OF DRAWINGS

FIGS. 3(a) and 3(b) are views showing an exemplary structure of decoding ability information of a reception side.

FIG. 8 is a view showing periods of various pieces of transmission data in a case where image data having width× height of 1920 pixels×1080 lines is transmitted via TMDS channels.

MODE(S) FOR CARRYING OUT THE INVENTION

Hereinafter, an aspect for implementing an invention (hereinafter, referred to as "embodiment") will be described. Note that description will be provided in the following order.

1. Embodiment

2. Modification Example

1. Embodiment

[Configuration Example of AV System]

Figure 1:
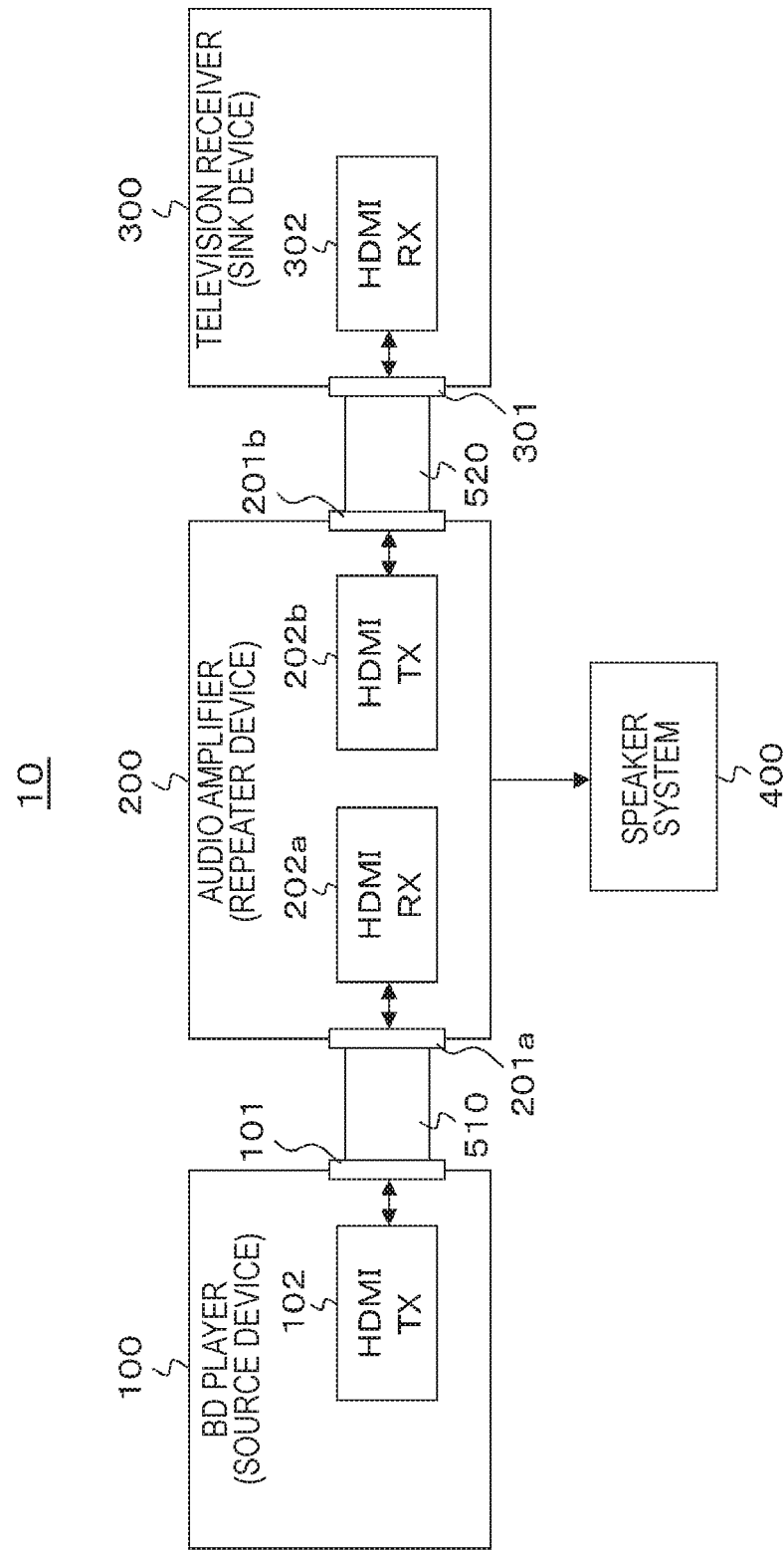
FIG. 1 is a block diagram showing a configuration example of an AV system serving as an embodiment.

FIG. 1 shows a configuration example of an audio visual (AV) system 10 serving as an embodiment. This AV system 10 includes a Blu-ray Disc (BD) player 100 serving as a source device, an audio amplifier 200 serving as a repeater device, and a television receiver 300 serving as a sink device. A speaker system 400 for multiple channels is connected to the audio amplifier 200.

Further, the BD player 100 and the audio amplifier 200 are connected through an HDMI cable 510. In the BD player 100, an HDMI terminal 101 to which an HDMI transmission unit (HDNI TX) 102 is connected is provided. In the audio amplifier 200, an HDMI terminal 201a to which an HDMI reception unit (HDMI RX) 202a is connected is provided. One end of the HDMI cable 510 is connected to the HDMI terminal 101 of the BD player 100, and the other end thereof is connected to the HDMI terminal 201a of the audio amplifier 200.

The audio amplifier 200 and the television receiver 300 are connected through an HDMI cable 520. In the audio amplifier 200, an HDMI terminal 201b to which an HDMI transmission unit (HDMI TX) 202b is connected is provided. In the television receiver 100, an HDMI terminal 301 to which an HDMI reception unit (HDMI RX) 302 is connected is provided. One end of the HDMI cable 520 is connected to the HDMI terminal 201b of the audio amplifier 200, and the other end thereof is connected to the HDMI terminal 301 of the television receiver 300. Note that "HDMI" is a registered trademark.

[Configuration Example of BD Player]

Figure 2:
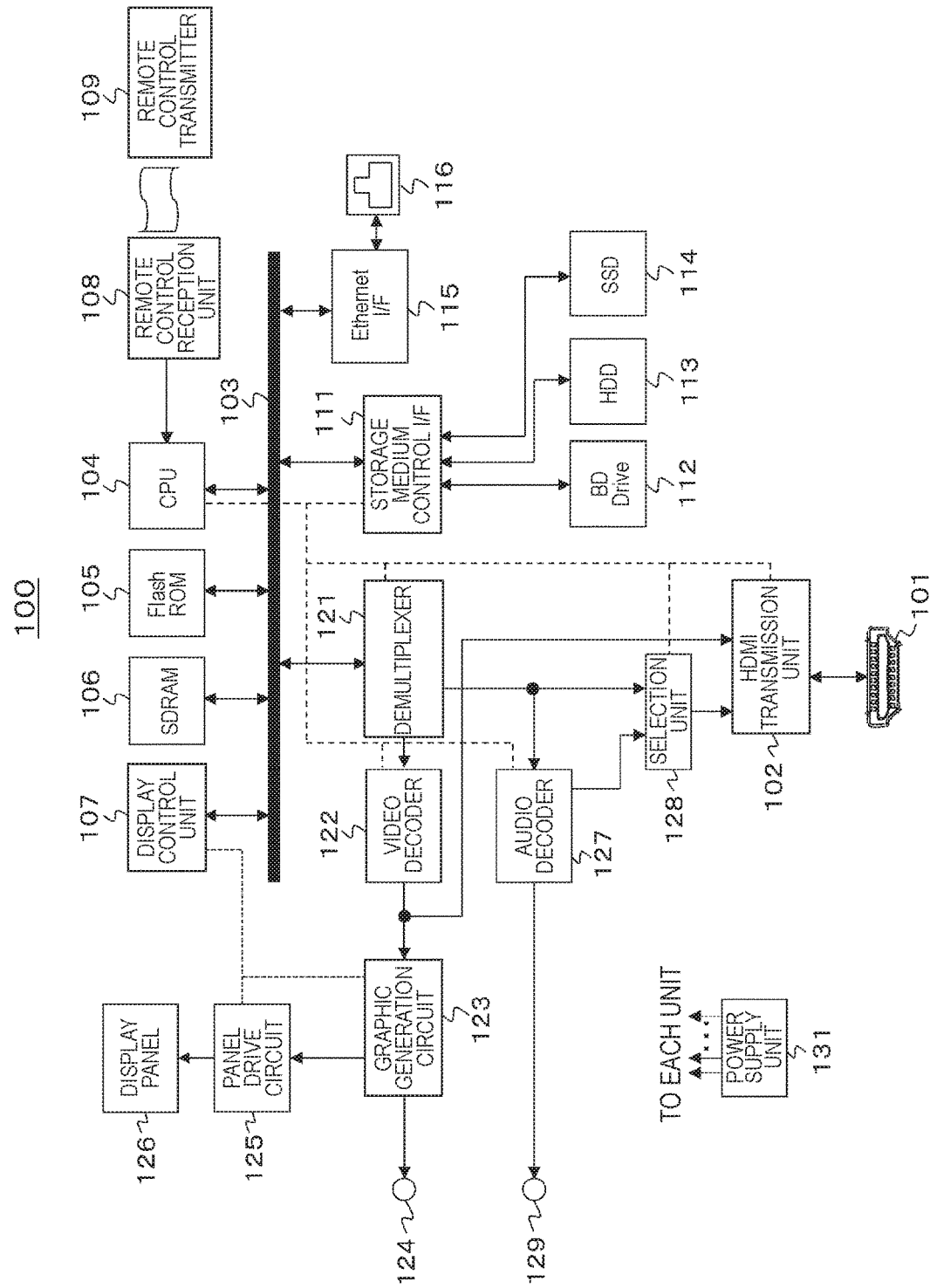
FIG. 2 is a block diagram showing a configuration example of a BD player constituting an AV system.

FIG. 2 shows a configuration example of the BD player 100. This BD player 100 includes the HDMI terminal 101 and the HDMI transmission unit 102. Further, this BD player 100 includes an internal bus 103, a central processing unit (CPU) 104, a flash read only memory (ROM) 105, a synchronous random access memory (SDRAM) 106, a display control unit 107, a remote control reception unit 108, and a remote control transmitter 109.

Further, the BD player 100 includes a storage (recording) medium control interface 111, a Blu-ray Disc (BD) drive 112, a hard disk drive (HDD) 113, a solid state drive (SSD)

114, an Ethernet interface (Ethernet I/F) 115, and a network terminal 116. Note that "Ethernet" is a registered trademark.

Further, the BD player 100 includes a demultiplexer 121, a video decoder 122, a graphic generation circuit 123, a video output terminal 124, a panel drive circuit 125, a display panel 126, an audio decoder 127, a selection unit 128, and an audio output terminal 129. Further, the BD player 100 includes a power supply unit 131. The power supply unit 131 supplies power to each unit of the BD player 100. Note that the power supply unit 131 may be an AC power supply or may be a cell (storage cell, dry cell).

The CPU 104, the flash ROM 105, the SDRAM 106, the display control unit 107, the storage medium control interface 111, the Ethernet interface 115, and the demultiplexer 121 are connected to the internal bus 103. The CPU 104 controls operation of each unit of the BD player 100.

The flash ROM 105 stores control software and stores data. The SDRAM 106 forms a work area of the CPU 104. The CPU 104 expands the software and the data read from the flash ROM 105 on the SDRAM 106 and starts the software, thereby controlling each unit of the BD player 100.

The remote control reception unit 108 receives a remo control signal (remote control code) transmitted from the remote control transmitter 109 and supplies the signal to the CPU 104. The CPU 104 controls each unit of the BD player 100 in accordance with the remote control code. Note that, in the present embodiment, a remote control unit is shown as a user instruction input unit. However, the user instruction input unit may be another configuration such as a switch, a wheel, a touch screen unit through which instruction input is performed by an approach/touch, a mouse, a keyboard, a gesture input unit for detecting instruction input by using a camera, or an audio input unit through which instruction input is performed by audio.

The BD drive 112 records content data on a BD disc serving as a disc-like recording medium or reproduces the content data from this BD disc. The HDD 113 records content data or reproduces the content data. The SSD 114 records content data on a semiconductor memory such as a memory card or reproduces the content data from this semiconductor memory.

The BD drive 112, the HDD 113, and the SSD 114 are connected to the internal bus 103 via the storage medium control interface 111. For example, a SATA interface is used as an interface for the BD drive 112 and the HDD 113. Further, for example, a SATA interface or a PCIe interface is used as an interface for the SSD 114.

The network terminal 116 is a terminal connected to a network and is connected to the Ethernet interface 115. The Ethernet interface 115 establishes network connection through the network terminal 116.

The demultiplexer 121 extracts an encoded video stream and an encoded audio stream from a multiplexed stream that is content data reproduced in the BD drive 112, the HDD 113, or the SSD 114. The video decoder 122 performs decoding processing with respect to the encoded video stream, thereby obtaining uncompressed image data.

The graphic generation circuit 123 performs superimposition processing of graphics data and the like with respect to the image data obtained in the video decoder 122 as necessary. The video output terminal 124 outputs the image data output from the graphic generation circuit 123.

The panel drive circuit 125 drives the display panel 126 on the basis of the image data output from the graphic generation circuit 123. The display control unit 107 controls the graphics generation circuit 123 and the panel drive circuit 125, thereby controlling display on the display panel 126. The display panel 126 is configured as, for example, a liquid crystal display (LCD), a plasma display panel (PDP), or an organic electro-luminescence panel.

Note that, although there is described an example where not only the CPU 104 but also the display control unit 107 is provided in the present embodiment, display on the display panel 126 may be directly controlled by the CPU 104. Further, the CPU 104 and the display control unit 107 may be a single chip or may be a plurality of cores.

The audio decoder 127 performs decoding processing with respect to the encoded audio stream extracted in the demultiplexer 121, thereby obtaining uncompressed audio data. In the present embodiment, the encoded audio stream is an encoded audio stream of object-based audio including encoded data of a plurality of object sound sources having degree-of-priority information. The encoded data of each of the object sound sources is made up of not only sound data but also metadata such as position information on an axis of coordinates.

The audio decoder 127 subjects the encoded audio stream to decoding processing, thereby obtaining uncompressed audio data having a predetermined number of channels, and generates a decoded audio stream including this uncompressed audio data having the predetermined number of channels. The audio output terminal 129 outputs the uncompressed audio data having the predetermined number of channels obtained in the audio decoder 127.

Note that the number of channels of the uncompressed audio data to be output to the audio output terminal 129 may be different from the number of channels of the uncompressed audio data included in the decoded audio stream. For example, the number of channels of the uncompressed audio data included in the decoded audio stream is "6" for 5.1 channel, whereas the number of channels of the uncompressed audio data to be output to the audio output terminal 129 is "2" for a stereo.

In a case where the audio decoder 127 subjects the encoded audio stream to decoding processing, the audio decoder 127 performs the decoding processing within a range of a decoding ability of the audio decoder 127. That is, among pieces of encoded data of a plurality of object sound sources included in the encoded audio stream, the audio decoder 127 performs decoding processing with respect to pieces of encoded data of a predetermined number of object sound sources having degrees of preference falling within a range of a degree of priority with which the audio decoder 127 can perform decoding, thereby obtaining uncompressed audio data having a predetermined number of channels.

Under control of the CPU 104, the selection unit 128 takes out the encoded audio stream extracted in the demultiplexer 121 or the decoded audio stream generated in the audio decoder 127 as an audio stream to be transmitted to the reception side via the digital interface of an HDMI.

The CPU 104 determines whether or not a decoding ability of the reception side is equal to or greater than a decoding ability of the own side on the basis of decoding ability information of the reception side, that is, information indicating to what number of degree of priority the reception side, i.e., the audio amplifier 200 in the present embodiment, can perform decoding. In the present embodiment, the CPU 104 receives this decoding ability information of the reception side from the reception side via the digital interface of the HDMI.

FIGS. 3(a) and 3(b) show an exemplary structure of the decoding ability information of the reception side. Although, as shown in FIG. 3(a), this decoding ability information is 8-bit information as a whole, low-order 4 bits from a third bit to a zeroth bit constitute substantial information, as shown in FIG. 3(b). For example, "0000" shows that the reception side is not compatible with decoding of an encoded audio stream of object-based audio.

Further, for example, "0001" shows that only decoding at a degree of priority 1 can be performed, in other words, only decoding of encoded data of an object sound source having a degree of priority 1 can be performed. Further, for example, "0010" shows that decoding can be performed to a degree of priority 2, in other words, encoded data of an object sound source having a degree of priority 1 or 2 can be decoded. The same applies hereinafter.

In a case where the CPU 104 determines that the decoding ability of the reception side is equal to or greater than the decoding ability of the own side, the CPU 104 performs control so that the encoded audio stream is taken out in the selection unit 128. Further, in a case where the CPU 104 determines that the decoding ability of the reception side is less than the decoding ability of the own side, the CPU 104 performs control so that the decoded audio stream is taken out in the selection unit 128. By performing control as described above, it is possible to apply optimal decoding processing to the encoded audio stream.

Figure 4:
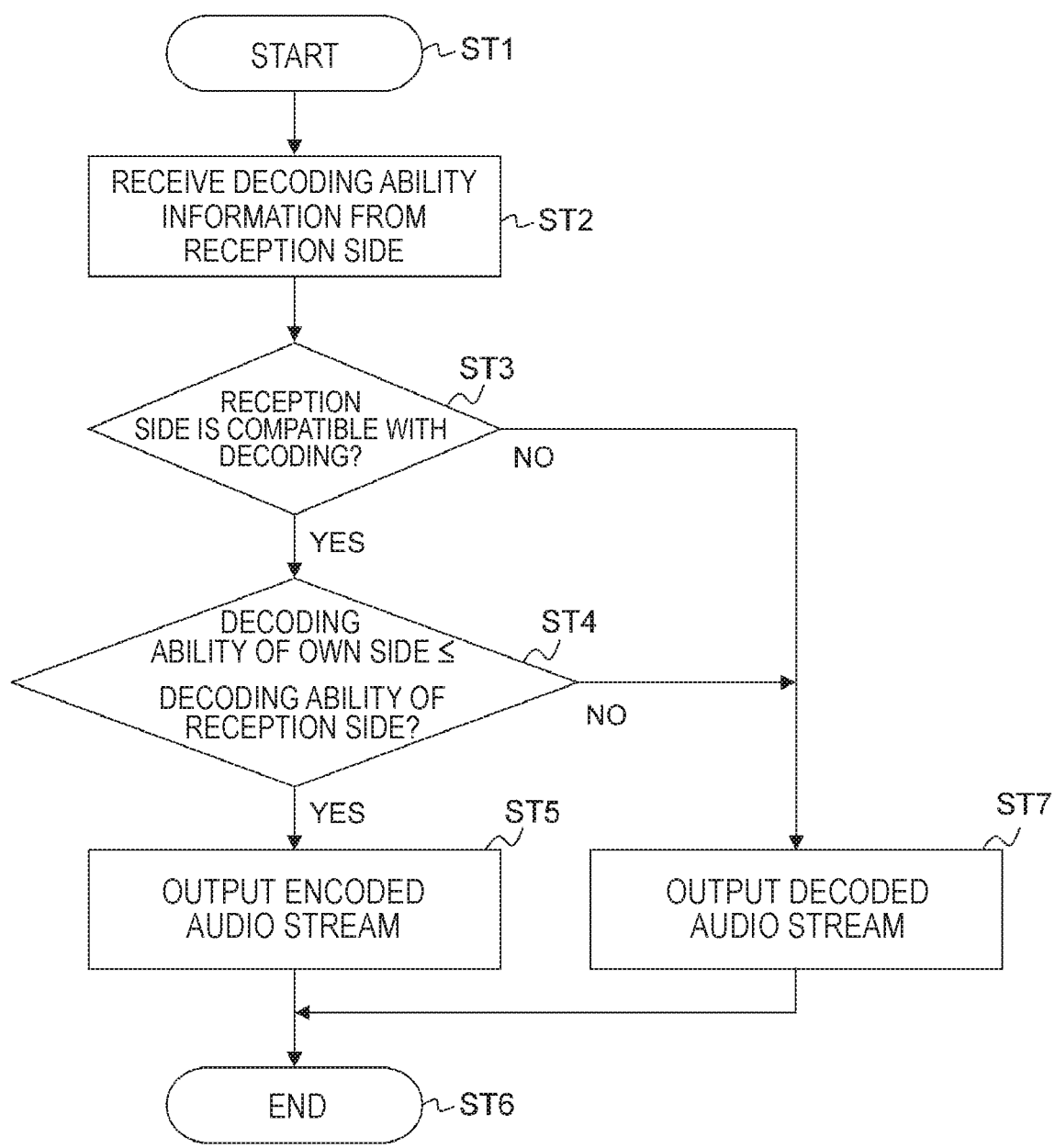
FIG. 4 is a flowchart showing an example of a control processing procedure in a CPU of a BD player.

A flowchart of FIG. 4 shows an example of a control processing procedure in the CPU 104. The CPU 104 starts determination processing in Step ST1. Then, in Step ST2, the CPU 104 receives decoding ability information of the reception side from the reception side via the digital interface of the HDMI (see FIGS. 3(a) and 3(b)). For example, on the reception side, the decoding ability information is recorded as a piece of extended display identification data (EDID). The CPU 104 reads the EDID via a display data channel (DDC) channel, thereby acquiring the decoding ability information of the reception side.

Next, in Step ST3, the CPU 104 determines whether or not the reception side is compatible with decoding of an encoded audio stream of object-based audio. In a case where the reception side is compatible with decoding, in Step ST4, the CPU 104 determines whether or not the decoding ability of the reception side is equal to or greater than the decoding ability of the own side.

In a case where the decoding ability of the reception side is equal to or greater than the decoding ability of the own side, in Step ST5, the CPU 104 determines that an encoded audio stream is output and performs control so that the encoded audio stream is taken out in the selection unit 128. Thereafter, the CPU 104 terminates control processing in Step ST6.

Further, in a case where the reception side is not compatible with decoding of an encoded audio stream of object-based audio in Step ST3 or the decoding ability of the reception side is less than the decoding ability of the own side in Step ST4, in Step ST7, the CPU 104 determines that a decoded audio stream is output and performs control so that the decoded audio stream is taken out in the selection unit 128. Thereafter, the CPU 104 terminates the control processing in Step ST6.

Referring back to FIG. 2, the HDMI transmission unit 102 transmits the uncompressed image data obtained in the video decoder 122 and the audio stream taken out in the selection unit 128 through the HDMI terminal 101 via communication conforming to the HDMI. The HDMI transmission unit 102 packs the image data and the audio stream and outputs the image data and the audio stream to the HDMI terminal 101 in order to perform transmission via a TMDS channel of the HDMI. Detailed description of this HDMI transmission unit 102 will be provided below.

Operation of the BD player 100 shown in FIG. 2 will be briefly described. At the time of recording, content data to be recorded is acquired through a digital tuner (not shown) or the network terminal 116 via the Ethernet interface 115. This content data is input to the storage medium control interface 111 and is recorded on a BD disc by the BD drive 112, on the HDD 113, or on a semiconductor memory by the SSD 114.

At the time of reproduction, a multiplexed stream that is the content data reproduced in the BD drive 112, the HDD 113, or the SSD 114 is supplied to the demultiplexer 121 via the storage medium control interface 111. In the demultiplexer 121, an encoded video stream and an encoded audio stream are extracted from the multiplexed stream.

The encoded video stream extracted in the demultiplexer 121 is supplied to the video decoder 122. In the video decoder 122, the encoded video stream is subjected to decoding processing, and therefore uncompressed image data is obtained. This image data is subjected to superimposition processing of graphics data and the like in the graphic generation circuit 123 as necessary and is then output to the video output terminal 124. Further, the image data is supplied from the graphic generation circuit 123 to the panel drive circuit 125 and a reproduction image is displayed on the display panel 126 in accordance with user operation.

Further, the encoded audio stream extracted in the demultiplexer 121 is supplied to the audio decoder 127. This encoded audio stream is an encoded audio stream of object-based audio including encoded data of a plurality of object sound sources having degree-of-priority information.

In the audio decoder 127, the encoded audio stream is subjected to decoding processing, and therefore uncompressed audio data having a predetermined number of channels is obtained, and a decoded audio stream including this uncompressed audio data having the predetermined number of channels is generated. The uncompressed audio data having the predetermined number of channels generated in the audio decoder 127 is output to the audio output terminal 129.

Further, the encoded audio stream extracted in the demultiplexer 121 is supplied to the selection unit 128. The decoded audio stream generated in the audio decoder 127 is also supplied to this selection unit 128. In the selection unit 128, under control of the CPU 104, the encoded audio stream or decoded audio stream is taken out as an audio stream to be transmitted to the reception side via the HDMI.

In the CPU 104, whether or not the decoding ability of the reception side is equal to or greater than the decoding ability of the own side is determined on the basis of the decoding ability information of the reception side (information indicating to what number of degree of priority decoding can be performed), and the selection unit 128 is controlled on the basis of the determination result. In a case where the decoding ability of the reception side is equal to or greater than the decoding ability of the own side, the encoded audio stream is taken out in the selection unit 128. On the contrary, in a case where the decoding ability of the reception side is less than the decoding ability of the own side, the decoded audio stream is taken out in the selection unit 128.

At the time of reproduction, in a case where content data reproduced in the BD drive 112, the HDD 113, or the SSD 114 is transmitted via the TMDS channel of the HDMI, the audio stream taken out in the selection unit 128 is supplied to the HDMI transmission unit 102, and the uncompressed image data obtained in the video decoder 122 is supplied to the HDMI transmission unit 102. In the HDMI transmission unit 102, the image data and the audio stream are packed and are output to the HDMI terminal 101.

[Configuration Example of Audio Amplifier]

Figure 5:
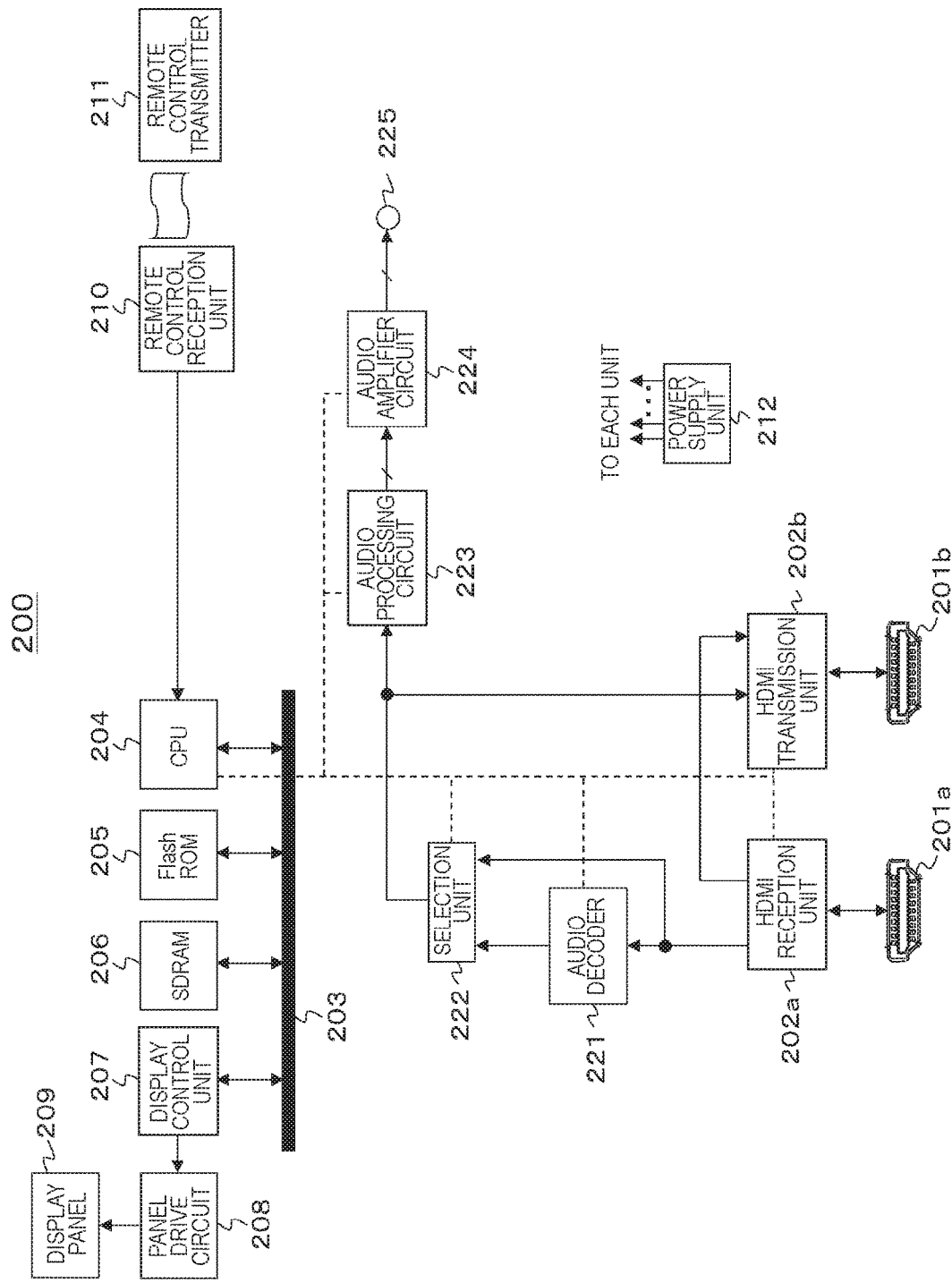
FIG. 5 is a block diagram showing a configuration example of an audio amplifier constituting an AV system.

FIG. 5 shows a configuration example of the audio amplifier 200. The audio amplifier 200 includes the HDMI terminals 201a and 201b, the HDMI reception unit 202a, and the HDMI transmission unit 202b. Further, the audio amplifier 200 includes an audio decoder 221, a selection unit 222, an audio processing circuit 223, an audio amplifier circuit 224, and an audio output terminal 225.

Further, the audio amplifier 200 includes an internal bus 203, a CPU 204, a flash ROM 205, an SDRAM 206, a display control unit 207, a panel drive circuit 208, a display panel 209, a remote control reception unit 210, a remote control transmitter 211, and a power supply unit 212. The CPU 204, the flash ROM 205, the SDRAM 206, and the display control unit 207 are connected to the internal bus 203.

The CPU 204 controls operation of each unit of the audio amplifier 200. The flash ROM 205 stores control software and stores data. The SDRAM 206 forms a work area of the CPU 204. The CPU 204 expands the software and the data read from the flash ROM 205 on the SDRAM 206 and starts the software, thereby controlling each unit of the audio amplifier 200.

The remote control reception unit 210 receives a remo control signal (remote control code) transmitted from the remote control transmitter 211 and supplies the signal to the CPU 204. The CPU 204 controls each unit of the audio amplifier 200 on the basis of this remote control code. Note that, in the present embodiment, a remote control unit is shown as a user instruction input unit. However, the user instruction input unit may be another configuration such as a switch, a wheel, a touch screen unit through which instruction input is performed by an approach/touch, a mouse, a keyboard, a gesture input unit for detecting instruction input by using a camera, or an audio input unit through which instruction input is performed by audio.

In order to, for example, display a user interface or display a status of the audio amplifier 200, the display control unit 207 controls the panel drive circuit 208, thereby controlling display on the display panel 209. The display panel 209 is configured as, for example, a liquid crystal display (LCD) or an organic electro-luminescence panel.

Note that, although there is described an example where not only the CPU 204 but also the display control unit 207 is provided in the present embodiment, display on the display panel 209 may be directly controlled by the CPU 204. Further, the CPU 204 and the display control unit 207 may be a single chip or may be a plurality of cores. The power supply unit 212 supplies power to each unit of the audio amplifier 200. This power supply unit 212 may be an AC power supply or may be a cell (storage cell, dry cell).

The HDMI reception unit 202a receives uncompressed image data and an audio stream to be supplied to the HDMI terminal 201a through the HDMI cable via communication conforming to the HDMI. This audio stream is an encoded audio stream of object-based audio including encoded data of a plurality of object sound sources having degree-of-priority information or a decoded audio stream including uncompressed audio data having a predetermined number of channels. Detailed description of this HDMI reception unit 202a will be provided below.

In a case where the audio stream received by the HDMI reception unit 202a is an encoded audio stream, the audio decoder 221 subjects this encoded audio stream to decoding processing, thereby obtaining uncompressed audio data having a predetermined number of channels, and generates a decoded audio stream including this uncompressed audio data having the predetermined number of channels.

Under control of the CPU 204, the selection unit 222 takes out the audio stream received by the HDMI reception unit 202a or the decoded audio stream obtained in the audio decoder 221. In this case, in a case where the audio stream received by the HDMI reception unit 202a is an encoded audio stream, the selection unit 222 takes out the decoded audio stream obtained in the audio decoder 221. Further, in a case where the audio stream received by the HDMI reception unit 202a is a decoded audio stream, the selection unit 222 takes out the decoded audio stream.

The audio processing circuit 223 takes out the uncompressed audio data having the predetermined number of channels from the decoded audio stream taken out in the selection unit 222 and performs necessary processing such as D/A conversion. Note that the audio processing circuit 223 performs necessary up/down mixing processing in accordance with a configuration of the speaker system 400 to be connected, thereby obtaining audio signals of the necessary number of channels. The audio amplifier circuit 224 amplifies the audio signal of each channel obtained in the audio processing circuit 223 and outputs the audio signal to the audio output terminal 225. Note that the speaker system 400 is connected to the audio output terminal 225.

The HDMI transmission unit 202b transmits the uncompressed image data received by the HDMI reception unit 202a and the decoded audio stream taken out in the selection unit 222 through the HDMI terminal 201b via communication conforming to the HDMI. In order to perform transmission via the TMDS channel of the HDMI, the HDMI transmission unit 202b packs the image data and the audio stream and outputs the image data and the audio stream to the HDMI terminal 201b. Detailed description of this HDMI transmission unit 202b will be provided below.

Operation of the audio amplifier 200 shown in FIG. 5 will be briefly described. In the HDMI reception unit 202a, uncompressed image data and an audio stream (encoded audio stream or decoded audio stream), which are transmitted to the HDMI terminal 201a from the BD player 100 through the HDMI cable, are received.

The audio stream received by the HDMI reception unit 202a is supplied to the audio decoder 221. In the audio decoder 221, in a case where the audio stream received by the HDMI reception unit 202a is an encoded audio stream, this encoded audio stream is subjected to decoding processing, and therefore uncompressed audio data having a predetermined number of channels is obtained, and a decoded audio stream including this uncompressed audio data having the predetermined number of channels is generated.

In the selection unit 222, under control of the CPU 204, the audio stream received by the HDMI reception unit 202a or the decoded audio stream obtained in the audio decoder 221 is taken out. In this case, in a case where the audio stream received by the HDMI reception unit 202a is an encoded audio stream, the decoded audio stream obtained in the audio decoder 221 is taken out in the selection unit 222. Meanwhile, in a case where the audio stream received by the HDMI reception unit 202a is a decoded audio stream, the decoded audio stream is taken out in the selection unit 222.

With this, the decoded audio stream is always taken out from the selection unit 222. In a case where a decoding ability of the own side is equal to or greater than the decoding ability of the transmission side, the decoded audio stream is generated in the audio decoder 221. Further, in a case where the decoding ability of the own side is less than the decoding ability of the transmission side, this decoded audio stream is generated in the audio decoder of the transmission side (see the audio decoder 127 in FIG. 2). Therefore, this decoded audio stream is obtained by applying optimal decoding processing to the encoded audio stream.

The decoded audio stream taken out in the selection unit 222 is supplied to the audio processing circuit 223. In the audio processing circuit 223, the uncompressed audio data having the predetermined number of channels is taken out from the decoded audio stream and is further subjected to necessary processing such as up/down mixing and D/A conversion, and therefore audio signals of the necessary number of channels are obtained. Then, when muting is in an off state, the audio signal of each channel to be output from the audio processing circuit 223 is amplified in the audio amplifier circuit 224 and is output to the audio output terminal 225. Therefore, audio of the predetermined number of channels is output from the speaker system 400 connected to the audio output terminal 225.

Further, the uncompressed image data received by the HDMI reception unit 202a and the decoded audio stream taken out in the selection unit 222 are supplied to the HDMI transmission unit 202b. Note that, instead of the uncompressed image data itself received by the HDMI reception unit 202a, image data obtained by subjecting this image data to processing such as superimposition of graphics data may be supplied to the HDMI transmission unit 202b. In the HDMI transmission unit 202b, the image data and the audio stream are packed and are output to the HDMI terminal 201b.

[Configuration Example of Television Receiver]

Figure 6:
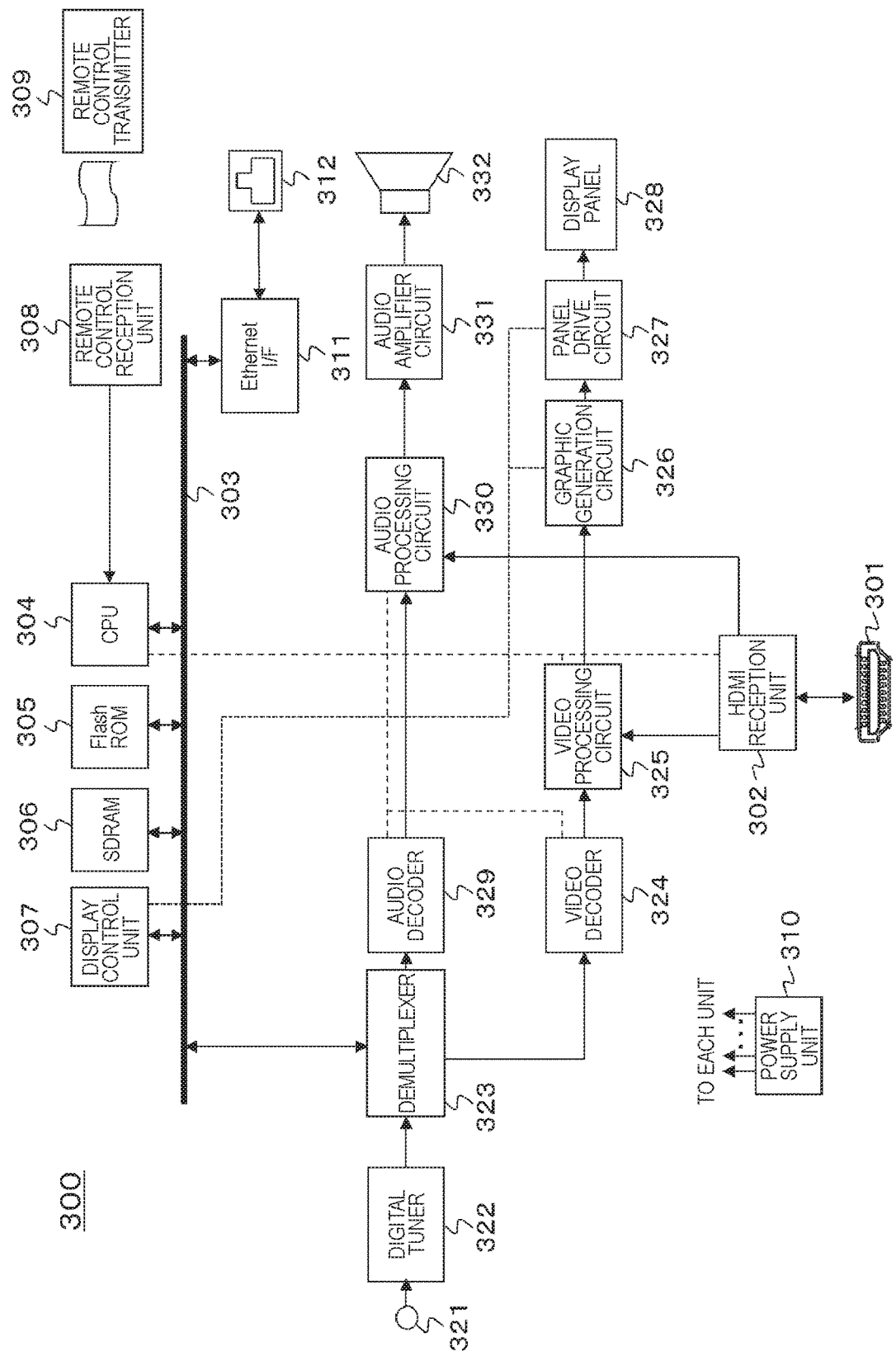
FIG. 6 is a block diagram showing a configuration example of a television receiver constituting an AV system.

FIG. 6 shows a configuration example of the television receiver 300. The television receiver 300 includes the HDMI terminal 301 and the HDMI reception unit 302. Further, the television receiver 300 includes an internal bus 303, a CPU 304, a flash ROM 305, an SDRAM (Synchronous RAM) 306, a display control unit 307, a remote control reception unit 308, a remote control transmitter 309, a power supply unit 310, an Ethernet interface (Ethernet I/F) 311, and a network terminal 312.

Further, the television receiver 300 includes an antenna terminal 321, a digital tuner 322, a demultiplexer 323, a video decoder 324, a video processing circuit 325, a graphic generation circuit 326, a panel drive circuit 327, and a display panel 328. Further, the television receiver 300 includes an audio decoder 329, an audio processing circuit 330, an audio amplifier circuit 331, and a speaker 332. The CPU 304, the flash ROM 305, the SDRAM 306, the display control unit 307, the Ethernet interface 311, and the demultiplexer 323 are connected to the internal bus 303.

The CPU 304 controls operation of each unit of the television receiver 300. The flash ROM 305 stores control software and stores data. The SDRAM 306 forms a work area of the CPU 304. The CPU 304 expands the software and the data read from the flash ROM 305 on the SDRAM 306 and starts the software, thereby controlling each unit of the television receiver 300.

The remote control reception unit 308 receives a remote control signal (remote control code) transmitted from the remote control transmitter 309 and supplies the signal to the CPU 304. The CPU 304 controls each unit of the television receiver 300 on the basis of this remote control code. Note that, in the present embodiment, a remote control unit is shown as a user instruction input unit. However, the user instruction input unit may be another configuration such as a switch, a wheel, a touch screen unit through which instruction input is performed by an approach/touch, a mouse, a keyboard, a gesture input unit for detecting instruction input by using a camera, or an audio input unit through which instruction input is performed by audio.

The power supply unit 310 supplies power to each unit of the television receiver 300. Note that the power supply unit 310 may be an AC power supply or may be a cell (storage cell, dry cell). The network terminal 312 is a terminal connected to a network and is connected to the Ethernet interface 311. The Ethernet interface 311 establishes network connection via the network terminal 312.

The HDMI reception unit 302 receives uncompressed image data and a decoded audio stream to be supplied to the HDMI terminal 301 through the HDMI cable via communication conforming to the HDMI. This decoded audio stream includes uncompressed audio data having a predetermined number of channels. Detailed description of this HDMI reception unit 302 will be provided below.

The antenna terminal 321 is a terminal through which a television broadcast signal received by a reception antenna (not shown) is input. The digital tuner 322 processes the television broadcast signal input to the antenna terminal 321, thereby obtaining a multiplexed stream that is content data compatible with a channel selected by the user.

The demultiplexer 323 extracts an encoded video stream and an encoded audio stream from the multiplexed stream obtained in the digital tuner 322. The video decoder 324 performs decoding processing with respect to the encoded video stream, thereby obtaining uncompressed image data. The video processing circuit 325 and the graphic generation circuit 326 perform scaling processing (resolution conversion processing), superimposition processing of graphics data, and the like with respect to the image data obtained in the video decoder 324 or the image data received by the HDMI reception unit 302 as necessary.

The panel drive circuit 327 drives the display panel 328 on the basis of the image data output from the graphic generation circuit 326. The display control unit 307 controls the graphics generation circuit 326 and the panel drive circuit 327, thereby controlling display on the display panel 328. The display panel 328 is configured as, for example, a liquid crystal display (LCD), a plasma display panel (PDP), or an organic electro-luminescence panel.

Note that, although there is described an example where not only the CPU 304 but also the display control unit 307 is provided in the present embodiment, display on the display panel 328 may be directly controlled by the CPU 304. Further, the CPU 304 and the display control unit 307 may be a single chip or may be a plurality of cores.

The audio decoder 329 subjects the encoded audio stream extracted in the demultiplexer 323 to decoding processing, thereby obtaining uncompressed audio data having a predetermined number of channels.

The audio processing circuit 330 subjects the uncompressed audio data having the predetermined number of channels obtained in the audio decoder 329 to necessary processing such as up/down mixing and D/A conversion in accordance with a configuration of the speaker 332, thereby obtaining audio signals of the necessary number of channels. Alternatively, the audio processing circuit 330 takes out the uncompressed audio data having the predetermined number of channels from the decoded audio stream received by the HDMI reception unit 302, performs necessary processing such as up/down mixing and D/A conversion in accordance with the configuration of the speaker 332, thereby obtaining audio signals of the necessary number of channels.

The audio amplifier circuit 331 amplifies the audio signal of each channel obtained in the audio processing circuit 330 and supplies the audio signal to the speaker 332. Note that the speaker 332 may be monaural or stereo. Further, the speaker 332 may be an earphone or headphone. Further, the speaker 332 may be compatible with a multiple channel such as 2.1 channel or 5.1 channel. Further, the speaker 332 may be connected to the television receiver 300 via a wireless network. Further, the speaker 332 may be another device.

Operation of the television receiver 300 shown in FIG. 6 will be briefly described. In the HDMI reception unit 302, uncompressed image data and a decoded audio stream, which are transmitted to the HDMI terminal 301 from the audio amplifier 200 through the HDMI cable, are received. The decoded audio stream includes uncompressed audio data having a predetermined number of channels. The uncompressed image data is supplied to the video processing circuit 325, and the decoded audio stream is supplied to the audio processing circuit 330.

Further, a television broadcast signal input to the antenna terminal 321 is supplied to the digital tuner 322. In this digital tuner 322, the television broadcast signal is processed, and therefore a multiplexed stream that is content data compatible with a channel selected by the user is obtained. This multiplexed stream is supplied to the demultiplexer 323.

In the demultiplexer 323, an encoded video stream and an encoded audio stream are extracted from the multiplexed stream. The encoded video stream is supplied to the video decoder 324. In the video decoder 324, the encoded video stream is subjected to decoding processing, and therefore uncompressed image data is obtained. This uncompressed image data is supplied to the video processing circuit 325.

In the video processing circuit 325 and the graphic generation circuit 326, scaling processing (resolution conversion processing), superimposition processing of graphics data, and the like are performed with respect to the image data obtained in the video decoder 324 or the image data received by the HDMI reception unit 302 as necessary. The image data subjected to the processing is supplied to the panel drive circuit 327, and an image compatible with the image data is displayed on the display panel 328.

Further, the encoded audio stream extracted in the demultiplexer 323 is supplied to the audio decoder 329. In the audio decoder 329, the encoded audio stream is subjected to decoding processing, and therefore uncompressed audio data having a predetermined number of channels is obtained. This uncompressed audio data having the predetermined number of channels is supplied to the audio processing circuit 330.

In the audio processing circuit 330, the uncompressed audio data having the predetermined number of channels obtained in the audio decoder 329 is subjected to necessary processing such as up/down mixing and D/A conversion in accordance with the configuration of the speaker 332, and therefore audio signals of the necessary number of channels are obtained. Alternatively, in the audio processing circuit 330, the uncompressed audio data having the predetermined number of channels is taken out from the decoded audio stream received by the HDMI reception unit 302, and then necessary processing such as up/down mixing and D/A conversion is performed in accordance with the configuration of the speaker 332, and therefore audio signals of the necessary number of channels are obtained.

The audio signals having the predetermined number of channels obtained in the audio processing circuit 330 are amplified in the audio amplifier circuit 331 and are then supplied to the speaker 332. Therefore, monaural, stereo, or multiple-channel audio, which is compatible with display of an image on the display panel 328, is output from the speaker 332.

"Configuration Example of HDMI Transmission Unit/Reception Unit"

Figure 7:
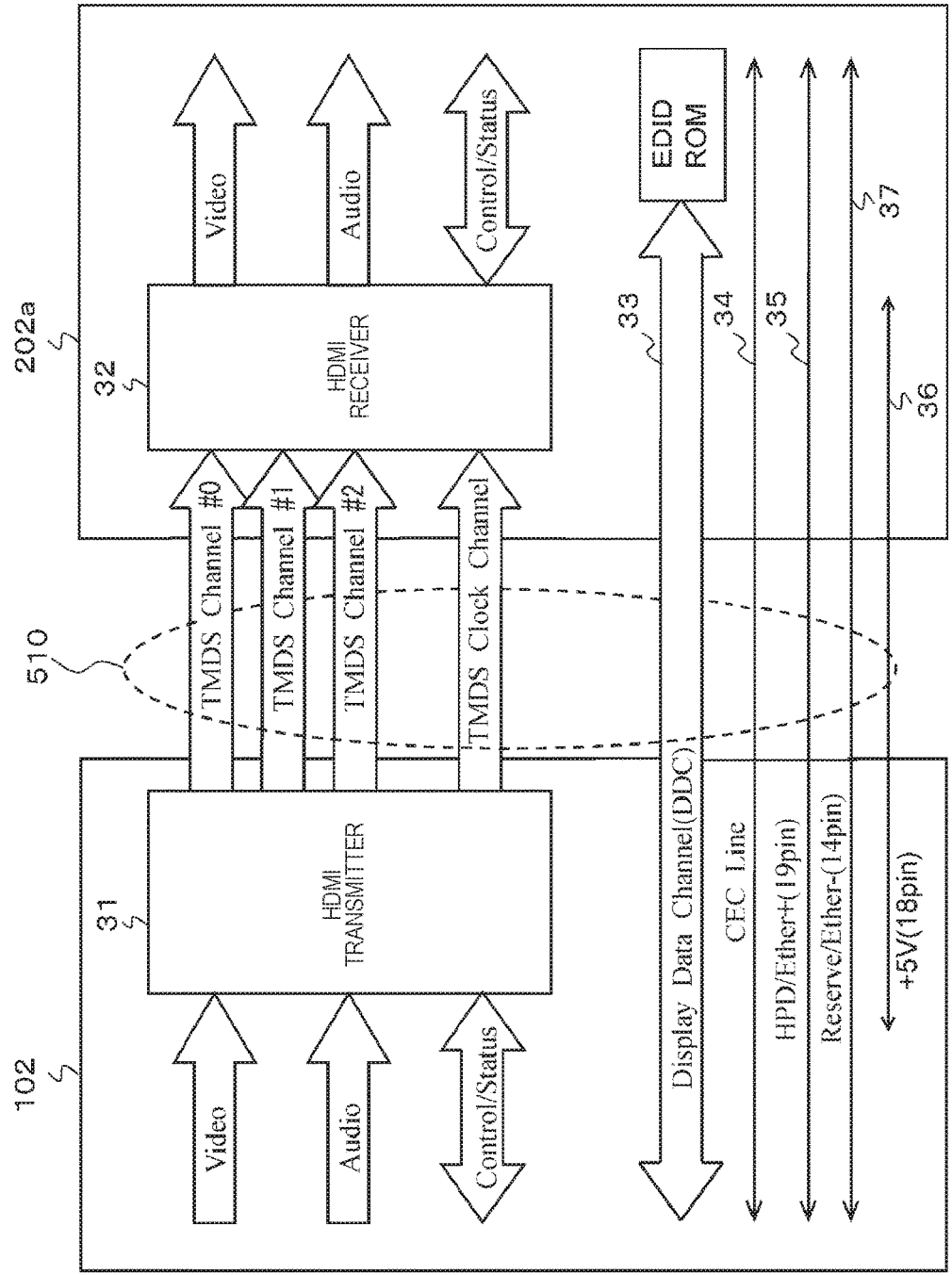
FIG. 7 is a block diagram showing a configuration example of an HDMI transmission unit of a BD player and an HDMI reception unit of an audio amplifier.

FIG. 7 shows a configuration example of the HDMI transmission unit 102 of the BD player 100 and the HDMI reception unit 202a of the audio amplifier 200 in the AV system 10 of FIG. 1. Note that a configuration example of the HDMI transmission unit 202b of the audio amplifier 200 and the HDMI reception unit 302 of the television receiver 300 is a similar configuration, and therefore description thereof will be omitted.

In an effective image period 21, which is a period in which a horizontal blanking period 22 and a vertical blanking period 23 are excluded from a period between a single vertical synchronization signal and the next vertical synchronization signal (hereinafter, also referred to as "active video period" as appropriate) (see FIG. 8), the HDMI transmission unit 102 transmits differential signals corresponding to pixel data of an uncompressed image corresponding to one screen to the HDMI reception unit 202a via a plurality of channels in one direction. Further, in the horizontal blanking period 22 or the vertical blanking period 23, the HDMI transmission unit 102 transmits at least differential signals corresponding to audio data associated with the image, control data, other auxiliary data, and the like to the HDMI reception unit 202a via the plurality of channels in one direction.

That is, the HDMI transmission unit 102 includes an HDMI transmitter 31. The transmitter 31 converts, for example, pixel data of an uncompressed image into differential signals corresponding thereto and serially transmits the differential signals to the HDMI reception unit 202a via three transition minimized differential signaling (TMDS) channels #0, #1, and #2 which are the plurality of channels in one direction.

Further, the transmitter 31 converts audio data associated with the uncompressed image, and, in addition, necessary control data, other auxiliary data, and the like into differential signals corresponding thereto and serially transmits the differential signals to the HDMI reception unit 202a via the three TMDS channels #0, #1, and #2 in one direction.

The HDMI reception unit 202a receives the differential signals corresponding to the pixel data, the differential signals being transmitted from the HDMI transmission unit 102 via the plurality of channels in one direction, in the active video period 21 (see FIG. 8). Further, the HDMI reception unit 202a receives the differential signals corresponding to the audio data and the control data, the differential signals being transmitted from the HDMI transmission unit 102 via the plurality of channel in one direction, in the horizontal blanking period 22 (see FIG. 8) or the vertical blanking period 23 (see FIG. 8).

Transmission channels in an HDMI system made up of the HDMI transmission unit 102 and the HDMI reception unit 202a are not only the three TMDS channels #0 to #2 serving as transmission channels for transmitting pixel data and audio data and a TMDS clock channel serving as a transmission channel for transmitting a pixel clock, but also transmission channels referred to as a display data channel (DDC) 33 and a consumer electronics control (CEC) line 34.

The DDC 33 is made up of two signal lines included in the HDMI cable 510 and is used in order that the HDMI transmission unit 102 reads extended display identification data (EDID) from the HDMI reception unit 202a connected through the HDMI cable 510. That is, the HDMI reception unit 202a includes not only an HDMI receiver 32 but also an EDID read only memory (ROM) that stores EDID serving as capability information regarding capability (Configuration Capability) of the own side. In the audio amplifier 200, decoding ability information (see FIGS. 3(a) and 3(b)) is recorded as a piece of this EDID. The HDMI transmission unit 102 reads the EDID, and therefore the decoding ability information of the reception side is transmitted to the transmission side.

The HDMI transmission unit 102 reads the EDID from the HDMI reception unit 202a connected through the HDMI cable 510 via the DDC 33. Then, the CPU 104 of the BD player 100 recognizes a capability of the audio amplifier 200 including the HDMI reception unit 202a on the basis of the EDID.

The CEC line 34 is made up of a single signal line included in the HDMI cable 510 and is used to perform bidirectional communication of control data between the HDMI transmission unit 102 and the HDMI reception unit 202a. Further, the HDMI cable 510 includes an HPD line 35 connected to a pin referred to as "hot plug detect (HPD)".

The source device can detect connection of the sink device by using this HPD line 35 with a DC bias potential. In this case, the HPD line 35 has a function of receiving a notification of a connection state from the sink device with a DC bias potential, which is seen from the source device side. On the contrary, this HPD line has a function of transmitting a notification of a connection state to the source device with a DC bias potential, which is seen from the sink device side.

Further, the HDMI cable 510 includes a power supply line 36 used to supply power from the source device to the sink device. The HDMI cable 510 further includes a reserve line 37. The HPD line 35 and the reserve line 37 are used to constitute a pair of differential transmission paths and are also used as a bidirectional communication channel.

FIG. 8 is a view showing periods of various pieces of transmission data in a case where image data having width×height of 1920 pixels×1080 lines is transmitted via the TMDS channels. In a video field in which transmission data is transmitted via the three TMDS channels of the HDMI, three types of periods, i.e., a video data period 24, a data island period 25, and a control period 26 exist in accordance with a type of transmission data.

Herein, the video field period is a period between an active edge of a certain vertical synchronization signal and an active edge of the next vertical synchronization signal and is divided into parts, i.e., the horizontal blanking period 22 (Horizontal Blanking), the vertical blanking period 23 (Vertical Blanking), and the active video period 21 (Active Video) which is a period in which the horizontal blanking period and the vertical blanking period are excluded from the video field period.

The video data period 24 is allotted to the active video period 21. In this video data period 24, data of active pixels of 1920 pixels×1080 lines forming uncompressed image data corresponding to one screen is transmitted. The data island period 25 and the control period 26 are allotted to the horizontal blanking period 22 and the vertical blanking period 23. In those data island period 25 and the control period 26, auxiliary data is transmitted.

That is, the data island period 25 is allotted to a part of the horizontal blanking period 22 and the vertical blanking period 23. In this data island period 25, for example, a packet of audio data, which is data irrelevant to control in the auxiliary data, is transmitted. The control period 26 is allotted to the other part of the horizontal blanking period 22 and the vertical blanking period 23. In this control period 26, for example, a vertical synchronization signal, a horizontal synchronization signal, and a control packet, which are data relevant to control in the auxiliary data, are transmitted.

As described above, in the AV system 10 shown in FIG. 1, the BD player 100 transmits an encoded stream to the audio amplifier 200 via the digital interface of the HDMI in a case where the decoding ability of the reception side is equal to or greater than the decoding ability of the own side and transmits a decoded stream in a case where the decoding ability of the reception side is less than the decoding ability of the own side. Therefore, it is possible to apply optimal decoding processing to the encoded stream, and the user can obtain audio output in an optimal state from the speaker system 400 connected to the audio amplifier 200.

Further, in the AV system 10 shown in FIG. 1, the BD player 100 receives the decoding ability information from the audio amplifier 200 and determines whether or not the decoding ability of the reception side is equal to or greater than the decoding ability of the own side, thereby determining whether to transmit an encoded stream or a decoded stream. Therefore, it is possible to obtain audio output in an optimal state from the speaker system 400 connected to the audio amplifier 200, without causing the user to perform any kind of operation.

2. Modification Example

Note that, in the above embodiment, there has been described an example where an encoded stream including a plurality of pieces of encoded data having degree-of-priority information is an encoded audio stream of object-based audio. It is needless to say that the present technology is also applicable to a case where an encoded video stream including a plurality of encoded video data having degree-of-priority information is treated. In this case, decoding processing of the encoded video stream is performed on a side having a higher decoding ability between the transmission side and the reception side.

Further, in the above embodiment, an example of the digital interface of the HDMI has been described. However, the digital interface is not limited to the HDMI.

Additionally, the present technology may also be configured as below.

(1)

A transmission apparatus including:

a stream acquisition unit configured to acquire an encoded stream including a plurality of pieces of encoded data having degree-of-priority information;

a decoding unit configured to subject the encoded stream acquired in the stream acquisition unit to decoding processing and generate a decoded stream including decoded data;

a determination unit configured to determine whether or not a decoding ability of a reception side is equal to or greater than a decoding ability of the own apparatus on the basis of decoding ability information of the reception side indicating to what number of degree of priority decoding can be performed; and a transmission unit configured to, in a case where the determination unit determines that the decoding ability of the reception side is equal to or greater than the decoding ability of the own apparatus, transmit the encoded stream acquired in the stream acquisition unit to the reception side via a digital interface and, in a case where the determination unit determines that the decoding ability of the reception side is less than the decoding ability of the own apparatus, transmit the decoded stream generated in the decoding unit to the reception side via the digital interface.

(2)

The transmission apparatus according to (1), in which the encoded stream is an encoded audio stream of object-based audio including encoded data of a plurality of object sound sources having degree-of-priority information, and the decoding unit subjects the encoded audio stream acquired in the stream acquisition unit to decoding processing and generates, as the decoded data, a decoded audio stream including audio data having a predetermined number of channels.

(3)

The transmission apparatus according to (1) or (2), further including an information reception unit configured to receive the decoding ability information of the reception side from the reception side via the digital interface.

(4)

The transmission apparatus according to any one of (1) to (3), in which the digital interface is an HDMI.

(5)

A transmission method including:

a stream acquisition step of acquiring an encoded stream including a plurality of pieces of encoded data having degree-of-priority information;

a determination step of determining whether or not a decoding ability of a reception side is equal to or greater than a decoding ability of an own apparatus on the basis of decoding ability information of the reception side indicating to what number of degree of priority decoding can be performed; and a transmission step of causing a transmission unit to, in a case where it is determined in the determination step that the decoding ability of the reception side is equal to or greater than the decoding ability of the own apparatus, transmit the encoded stream acquired in the stream acquisition step to the reception side via a digital interface and, in a case where it is determined in the determination step that the decoding ability of the reception side is less than the decoding ability of the own apparatus, transmit a decoded stream including decoded data generated by subjecting the encoded stream acquired in the stream acquisition step to decoding processing to the reception side via the digital interface.

(6)

A reception apparatus including:

an information transmission unit configured to transmit decoding ability information of the own apparatus indicating to what number of degree of priority decoding can be performed to a transmission side via a digital interface;

a reception unit configured to receive an encoded stream including a plurality of pieces of encoded data having degree-of-priority information or a decoded stream including decoded data generated by subjecting the encoded stream to decoding processing from the transmission side via the digital interface; and a decoding unit configured to, in a case where the reception unit receives the encoded stream, subject the encoded stream to decoding processing and generate a decoded stream including decoded data.

(7)

The reception apparatus according to (6), in which the encoded stream is an encoded audio stream of object-based audio including encoded data of a plurality of object sound sources having degree-of-priority information, and the decoded stream includes, as the decoded data, audio data having a predetermined number of channels generated by subjecting the encoded audio stream to decoding processing.

(8)

The reception apparatus according to (6) or (7), in which the digital interface is an HDMI.

(9)

A reception method including:

an information transmission step of transmitting decoding ability information of an own apparatus indicating to what number of degree of priority decoding can be performed to a transmission side via a digital interface;

a reception step of causing a reception unit to receive an encoded stream including a plurality of pieces of encoded data having degree-of-priority information or a decoded stream including decoded data generated by subjecting the encoded stream to decoding processing from the transmission side via the digital interface; and a decoding step of, in a case where the encoded stream is received in the reception step, subjecting the encoded stream to decoding processing and generating a decoded stream including decoded data.

REFERENCE SIGNS LIST

AV system
100 BD player
101 HDMI terminal
102 HDMI transmission unit
103 internal bus
104 CPU
105 flash ROM
106 SDRAM
107 display control unit
108 remote control reception unit
109 remote control transmitter
111 storage medium control interface
112 BD drive
113 HDD
114 SSD
115 Ethernet interface
116 network terminal
121 demultiplexer
122 video decoder
123 graphic generation circuit
124 video output terminal
125 panel drive circuit
126 display panel
127 audio decoder
128 selection unit
129 audio output terminal
131 power supply unit
200 audio amplifier
201a, 201b HDMI terminal
202a HDMI reception unit
202b HDMI transmission unit
203 internal bus
204 CPU
205 flash ROM
206 SDRAM
207 display control unit 208 panel drive circuit
209 display panel
210 remote control reception unit
211 remote control transmitter
212 power supply unit
221 audio decoder
222 selection unit
223 audio processing circuit
224 audio amplifier circuit
225 audio output terminal
300 television receiver
301 HDMI terminal
302 HDMI reception unit
303 internal bus
304 CPU
305 flash ROM
306 SDRAM
307 display control unit
308 remote control reception unit
309 remote control transmitter
310 power supply unit
311 Ethernet interface
312 network terminal
321 antenna terminal
322 digital tuner
323 demultiplexer
324 video decoder
325 video processing circuit
326 graphic generation circuit
327 panel drive circuit
328 display panel
329 audio decoder
330 audio processing circuit
331 audio amplifier circuit
332 speaker
400 speaker system
510, 520 HDMI cable

The invention claimed is:

1. A transmission apparatus, comprising:
a stream acquisition unit configured to acquire an encoded stream including a plurality of pieces of encoded data having degree-of-priority information;
a decoding unit configured to subject the encoded stream acquired in the stream acquisition unit to decoding processing and generate a decoded stream including decoded data;
a determination unit configured to determine whether or not a decoding ability of a reception side is equal to or greater than a decoding ability of an own apparatus based on decoding ability information of the reception side indicating a number of degree of priority to which decoding is executable; and
a transmission unit configured to, in a case where the determination unit determines that the decoding ability of the reception side is equal to or greater than the decoding ability of the own apparatus, transmit the encoded stream acquired in the stream acquisition unit to the reception side via a digital interface and, in a case where the determination unit determines that the decoding ability of the reception side is less than the decoding ability of the own apparatus, transmit the decoded stream generated in the decoding unit to the reception side via the digital interface.

2. The transmission apparatus according to claim 1, wherein the encoded stream is an encoded audio stream of object-based audio including encoded data of a plurality of object sound sources having the degree-of-priority information, and
the decoding unit subjects the encoded audio stream acquired in the stream acquisition unit to decoding processing and generates, as the decoded data, a decoded audio stream including audio data having a predetermined number of channels.

3. The transmission apparatus according to claim 1, further comprising
an information reception unit configured to receive the decoding ability information of the reception side from the reception side via the digital interface.

4. The transmission apparatus according to claim 1, wherein the digital interface is an HDMI.

5. A transmission method, comprising:
a stream acquisition step of acquiring an encoded stream including a plurality of pieces of encoded data having degree-of-priority information;
a determination step of determining whether or not a decoding ability of a reception side is equal to or greater than a decoding ability of an own apparatus based on decoding ability information of the reception side indicating a number of degree of priority to which decoding is executable; and
a transmission step of causing a transmission unit to, in a case where it is determined in the determination step that the decoding ability of the reception side is equal to or greater than the decoding ability of the own apparatus, transmit the encoded stream acquired in the stream acquisition step to the reception side via a digital interface and, in a case where it is determined in the determination step that the decoding ability of the reception side is less than the decoding ability of the own apparatus, transmit a decoded stream including decoded data generated by subjecting the encoded stream acquired in the stream acquisition step to decoding processing to the reception side via the digital interface.

6. A reception apparatus, comprising:
an information transmission unit configured to transmit decoding ability information of an own apparatus indicating a number of degree of priority to which decoding is executable to a transmission side via a digital interface;
a reception unit configured to receive an encoded stream including a plurality of pieces of encoded data having degree-of-priority information or a decoded stream including decoded data generated by subjecting the encoded stream to decoding processing from the transmission side via the digital interface; and
a decoding unit configured to, in a case where the reception unit receives the encoded stream, subject the encoded stream to decoding processing and generate the decoded stream including the decoded data.

7. The reception apparatus according to claim 6, wherein the encoded stream is an encoded audio stream of object-based audio including encoded data of a plurality of object sound sources having the degree-of-priority information, and
the decoded stream includes, as the decoded data, audio data having a predetermined number of channels generated by subjecting the encoded audio stream to the decoding processing.

8. The reception apparatus according to claim 6, wherein the digital interface is an HDMI.

9. A reception method, comprising:
an information transmission step of transmitting decoding ability information of an own apparatus indicating a number of degree of priority to which decoding is executable to a transmission side via a digital interface;
a reception step of causing a reception unit to receive an encoded stream including a plurality of pieces of encoded data having degree-of-priority information or a decoded stream including decoded data generated by subjecting the encoded stream to decoding processing from the transmission side via the digital interface; and
a decoding step of, in a case where the encoded stream is received in the reception step, subjecting the encoded stream to decoding processing and generating a decoded stream including the decoded data.

* * * * *